US012784160B2

(12) United States Patent
Kang et al.

(10) Patent No.: US 12,784,160 B2
(45) Date of Patent: Nov. 3, 2026

(54) SCANNING ELECTRON MICROSCOPE IMAGE DISTORTION CORRECTION METHOD, AND SEMICONDUCTOR MANUFACTURING METHOD USING THE CORRECTION METHOD

(71) Applicant: SAMSUNG ELECTRONICS CO., LTD., Suwon-si (KR)

(72) Inventors: Minsu Kang, Suwon-si (KR); Kwangeun Kim, Suwon-si (KR); Janghoon Kim, Suwon-si (KR); Seoyoung Park, Suwon-si (KR); Sangho Yun, Suwon-si (KR); Sungeun Lee, Suwon-si (KR); Woojin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 18/528,427

(22) Filed: Dec. 4, 2023

(65) Prior Publication Data

US 2024/0242317 A1 Jul. 18, 2024

(30) Foreign Application Priority Data

Jan. 18, 2023 (KR) ........................ 10-2023-0007502
Mar. 10, 2023 (KR) ........................ 10-2023-0031885

(51) Int. Cl.
*G06T 5/80* (2024.01)

(52) U.S. Cl.
CPC ...... *G06T 5/80* (2024.01); *G06T 2207/10061* (2013.01)

(58) Field of Classification Search
USPC .......................................................... 382/254
See application file for complete search history.

(56) References Cited

U.S. PATENT DOCUMENTS 7,473,502 B1 1/2009 Ausschnitt et al.
8,957,959 B2 2/2015 Dong et al.
(Continued)

FOREIGN PATENT DOCUMENTS

CN 107590787 B 6/2020
JP 6254856 B2 12/2017
KR 10-2248465 B1 5/2021

OTHER PUBLICATIONS

Falko Sojka, Matthias Meissner, Christian Zwick, Roman Forker, Torsten Fritz; Determination and correction of distortions and systematic errors in low-energy electron diffraction. Rev. Sci. Instrum. Jan. 1, 2013; 84 (1): 015111. https://doi.org/10.1063/1.4774110 (Year: 2013).*
(Continued)

*Primary Examiner* — Chineyere Wills-Burns
*Assistant Examiner* — Ethan N Wolfson
(74) *Attorney, Agent, or Firm* — Sughrue Mion, PLLC

(57) ABSTRACT

An scanning electron microscope (SEM) image distortion correction method includes obtaining at least one SEM image of holes provided on a wafer in a two-dimensional array structure, the holes including at least one central hole within a central region of the at least one SEM image and a plurality of peripheral holes outside the central region, expanding each of the plurality of peripheral holes in a minor axis direction such that a ratio of a minor axis to a major axis of each of the plurality of peripheral holes is about 1:1, and expanding each of the plurality of peripheral holes in multiple directions in the at least one SEM image such that a diameter of the at least one central hole and a diameter of at least one of the plurality of peripheral holes are substantially equal to each other.

20 Claims, 22 Drawing Sheets

(56) References Cited

U.S. PATENT DOCUMENTS

| | | | | |
|---|---|---|---|---|
| 9,831,061 | B2 | 11/2017 | Sang et al. | |
| 10,469,777 | B2 | 11/2019 | Pawlowicz et al. | |
| 10,672,119 | B2 * | 6/2020 | Yamaguchi | G01N 21/95692 |
| 11,830,176 | B2 * | 11/2023 | Lee | G06T 5/50 |
| 2007/0098248 | A1 * | 5/2007 | Toyoda | G06T 7/74 382/145 |
| 2008/0159609 | A1 * | 7/2008 | Miyamoto | G06T 7/0006 382/128 |
| 2009/0212213 | A1 * | 8/2009 | Nakasuji | H01J 37/28 250/442.11 |
| 2016/0189369 | A1 * | 6/2016 | Jung | G06T 7/0006 382/149 |
| 2017/0030712 | A1 * | 2/2017 | Hasumi | G01B 15/04 |
| 2020/0126242 | A1 * | 4/2020 | Fang | G06T 7/001 |
| 2020/0161081 | A1 * | 5/2020 | Pathangi | H01J 37/28 |
| 2020/0173940 | A1 * | 6/2020 | Kooiman | G01N 23/2251 |
| 2020/0218144 | A1 * | 7/2020 | Yang | G03F 1/36 |
| 2021/0110996 | A1 * | 4/2021 | Rhinow | H01J 37/21 |
| 2022/0230281 | A1 | 7/2022 | Kameda et al. | |
| 2022/0342316 | A1 * | 10/2022 | Kooiman | G03F 7/705 |

OTHER PUBLICATIONS

Maraghechi et al., "Correction of scanning electron microscope imaging artifacts in a novel digital image correlation framework", Experimental Mechanics, Mar. 12, 2019, 29 total pages, vol. 59, doi: 10.1007/s11340-018-00469-W.

Arikawa et al., "Accurate displacement field measurement with scanning electron microscopy imaging", Journal of Strain Analysis, Mar. 11, 2011, pp. 337-346, vol. 46, doi: 10.1177/0309324711405751.

Cizmar et al., "Real-Time Scanning Charged-Particle Microscope Image Composition with Correction of Drift", Microscopy and Microanalysis, Apr. 2011, pp. 302-308, vol. 17, doi:10.1017/S1431927610094250.

Kammers et al., "Digital Image Correlation under Scanning Electron Microscopy: Methodology and Validation", Experimental Mechanics, Jul. 11, 2013, 19 total pages, doi: 10.1007/s11340-013-9782-x.

Jin et al., "Correction of image drift and distortion in a scanning electron microscopy", Journal of Microscopy, Jun. 22, 2015, pp. 268-280, vol. 260, doi:10.1111/jmi.12293.

Neggers et al, "Time-resolved integrated digital image correlation", International Journal for Numerical Methods in Engineering, Mar. 26, 2015, 27 total pages, doi:10.1002/nme.4882.

Dufour et al., "Integrated digital image correlation for the evaluation and correction of optical distortions", Optics and Lasers in Engineering, May 1, 2014, pp. 121-133, doi:10.1016/j.optlaseng.2013.12.015.

Guery et al., "Characterization of SEM speckle pattern marking and imaging distortion by digital image correlation", Measurement Science and Technology, Nov. 26, 2013, 13 total pages, vol. 25, doi:10.1088/0957-0233/25/1/015401.

Mello et al., "Distortion Correction Protocol for Digital Image Correlation after Scanning Electron Microscopy: Emphasis on Long Duration and Ex-Situ Experiments", Experimental Mechanics, Jul. 13, 2017, 15 total pages, doi:10.1007/s11340-017-0303-1.

* cited by examiner

FIG. 4B

| row | col. | 1st-Ex | | 2nd-Ex |
|---|---|---|---|---|
| | | θ | Ex-Ratio (%) | Ex-Ratio (%) |
| 1 | 1 | -114.08 | 12.0 | 5.1 |
| 1 | 2 | -140.85 | 11.5 | 4.3 |
| 1 | 3 | 139.15 | 10.2 | 3.8 |
| 1 | 4 | 163.83 | 8.5 | 1.5 |
| 1 | 5 | 56.41 | 6.3 | 1.2 |
| 1 | 6 | 66.05 | 9.3 | 2.5 |
| 1 | 7 | 0.32 | 10.5 | 3.9 |
| 4000 1 | 8 | -11.20 | 11.2 | 5.3 |
| 2 | 1 | 29.83 | 6.2 | 1.5 |
| 2 | 2 | -31.82 | 4.3 | 0.8 |

FIG. 5D

| Correction | | Before correction | | After correction | |
|---|---|---|---|---|---|
| Position | | A | B | A | B |
| CD_x | Average | 20.37 | 21.12 | 21.15 | 21.18 |
| | 3σ | 2.36 | 2.01 | 1.95 | 1.93 |

FIG. 7C

| row | col. | pos. skew | |
|---|---|---|---|
| | | x | y |
| 1 | 1 | −1.51 | −1.24 |
| 1 | 2 | −1.23 | −1.12 |
| 1 | 3 | −1.15 | −1.02 |
| 1 | 4 | −0.74 | −0.42 |

FIG. 8

| row | col. | 1st-Ex | | 2nd-Ex | pos. skew | |
|---|---|---|---|---|---|---|
| | | θ | Ex-Ratio (%) | Ex-Ratio (%) | x | y |
| 1 | 1 | -114.08 | 12.0 | 5.1 | -1.51 | -1.24 |
| 1 | 2 | -140.85 | 11.5 | 4.3 | -1.23 | -1.12 |
| 1 | 3 | 139.15 | 10.2 | 3.8 | -1.15 | -1.02 |
| 1 | 4 | 163.83 | 8.5 | 1.5 | -0.74 | -0.42 |

SCANNING ELECTRON MICROSCOPE IMAGE DISTORTION CORRECTION METHOD, AND SEMICONDUCTOR MANUFACTURING METHOD USING THE CORRECTION METHOD

CROSS-REFERENCE TO RELATED APPLICATIONS

This application is based on and claims priority to Korean Patent Application No 10-2023-0031885, filed on Mar. 10, 2023, in the Korean Intellectual Property Office, and Korean Patent Application No. 10-2023-0007502, filed on Jan. 18, 2023, in the Korean Intellectual Property Office, the disclosures of which are incorporated herein by reference in their entirety.

BACKGROUND

1. Field

Example embodiments of the disclosure relate to a scanning electron microscope (SEM) image, and more particularly, to a method of correcting distortion of an SEM image.

2. Description of Related Art

An SEM is a type of electron microscope that scans and images the surface of a sample with an electron-beam. For example, an SEM analysis method may refer to an analysis method performed by firing electrons with a high-speed electron gun and detecting particles such as secondary electrons from the sample while the electrons collide and interact with the sample surface. Recently, as the measurement magnification in an SEM has increased, SEM image distortion has become severe. The distortion of the SEM image is greater in the periphery of the SEM image than in the center of the SEM image. Due to such SEM image distortion, problems such as an increase in the aspect ratio of a fitting ellipse and a decrease in a critical dimension (CD) in the x-axis direction may occur.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Provided are a scanning electron microscope (SEM) image distortion correction method capable of accurately correcting distortion of an SEM image, and a semiconductor device manufacturing method using the correction method.

Additional aspects will be set forth in part in the description which follows and, in part, will be apparent from the description, or may be learned by practice of the presented embodiments.

According to an aspect of an example embodiment, an SEM image distortion correction method may include obtaining at least one SEM image of holes provided on a wafer in a two-dimensional array structure, the holes including at least one central hole within a central region of the at least one SEM image and a plurality of peripheral holes outside the central region, expanding each of the plurality of peripheral holes in a minor axis direction such that a ratio of a minor axis to a major axis of each of the plurality of peripheral holes is about 1:1, and expanding each of the plurality of peripheral holes in multiple directions in the at least one SEM image such that a diameter of the at least one central hole and a diameter of at least one of the plurality of peripheral holes are substantially equal to each other.

According to an aspect of an example embodiment, an SEM image distortion correction method may include obtaining at least one SEM image of holes arranged in a two-dimensional array structure on a wafer, the wafer being an after develop inspection (ADI) sample, the holes including at least one central hole within a central region of the at least one SEM image and a plurality of peripheral holes outside the central region, expanding each of the plurality of peripheral holes in a minor axis direction such that a ratio of a minor axis to a major axis of each of the plurality of peripheral holes is about 1:1, expanding each of the plurality of peripheral holes in multiple directions such that a diameter of a central hole and a diameter of at least one of the plurality of peripheral holes are substantially the same in the at least one SEM image and correcting positions of the plurality of peripheral holes based on lattice constants of the at least one central hole.

According to an aspect of an example embodiment, a semiconductor manufacturing method may include correcting distortion of a first SEM image of first holes in a two-dimensional array structure on a first wafer, the first wafer being an ADI sample, applying a result of correcting the distortion of the first SEM image to an SEM equipment, obtaining a second SEM image of second holes in a two-dimensional array structure on a second wafer using the SEM equipment, determining whether critical dimensions (CDs) of the second holes on the second wafer are within a normal range, and performing a subsequent semiconductor process on the second wafer based on determining the CDs are within the normal range, where the correcting of the distortion of the first SEM image may include obtaining the first SEM image of the first holes from the first wafer, the first holes including at least one central hole within a central region of the first SEM image and a plurality of peripheral holes outside the central region of the first SEM image, expanding each of the plurality of peripheral holes in a minor axis direction such that a ratio of a minor axis to a major axis of the plurality of peripheral holes is about 1:1, expanding each of the plurality of peripheral holes in multiple directions such that a diameter of the at least one central hole and a diameter of at least one of the plurality of peripheral holes are substantially the same in the first SEM image, and correcting positions of the plurality of peripheral holes based on lattice constants of at least one central hole.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 4B is a table illustrating correction results according to an embodiment;

FIG. 5D is a table illustrating comparison results according to an embodiment;

FIG. 7C is a table illustrating position correction values according to an embodiment;

FIG. 8 is a table illustrating final correction values obtained through an operation of expanding in the short axis direction, an operation of expanding in the entire direction, and an operation of correcting the position in an SEM image distortion correction method according to an embodiment;

DETAILED DESCRIPTION

Figure 1:
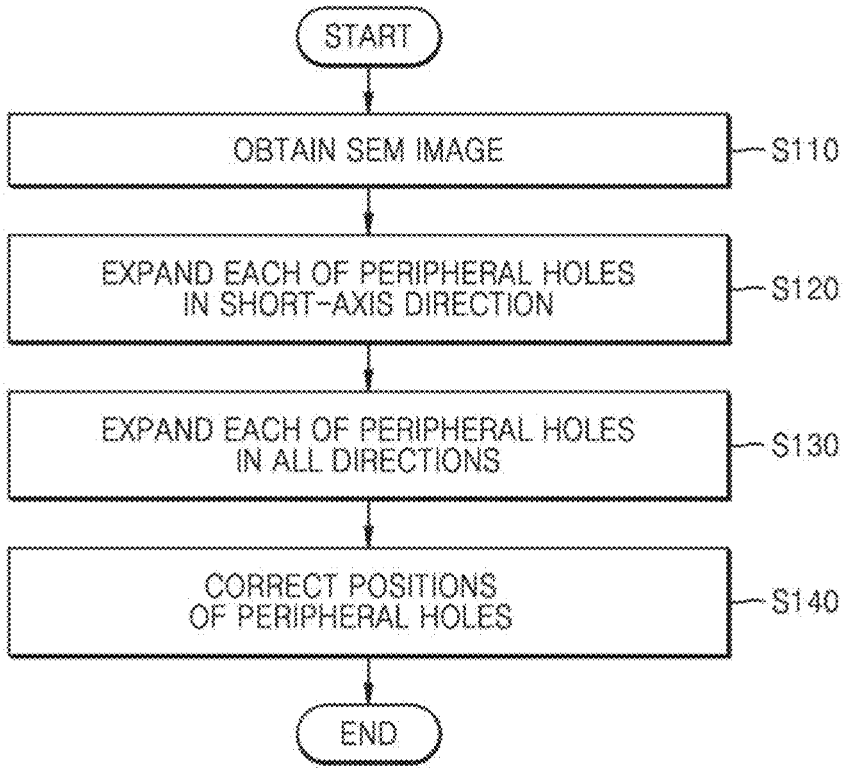
FIG. 1 is a flowchart illustrating a scanning electron microscope (SEM) image distortion correction method according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 2A:
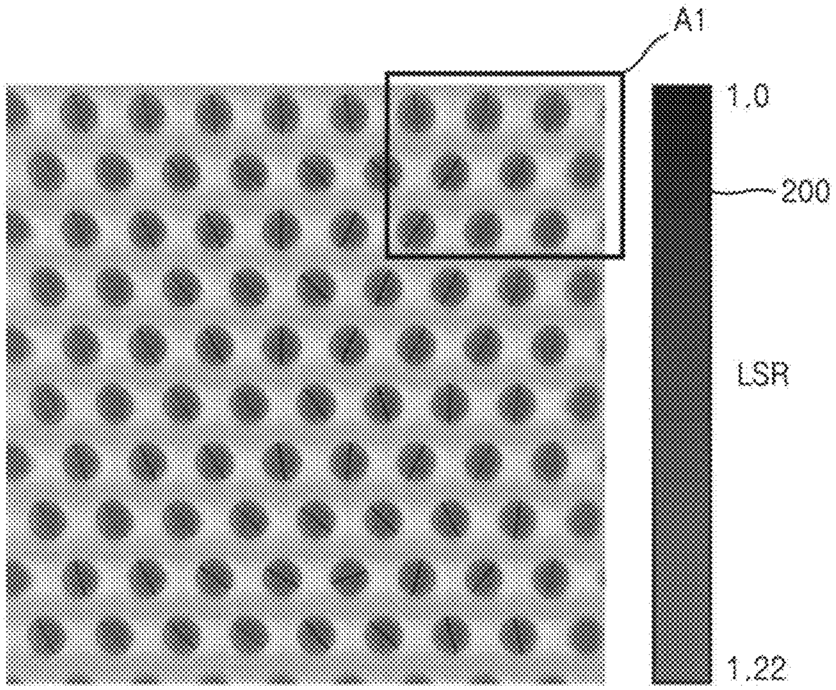
FIGS. 2A, 2B and 2C are SEM images obtained in relation to an SEM image distortion correction method according to an embodiment.
Figure 2B:
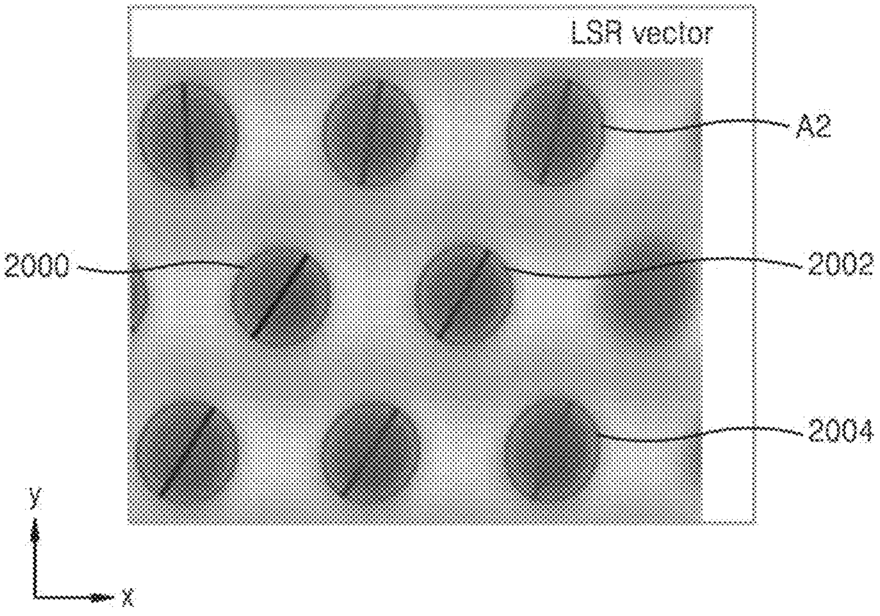
Figure 2C:
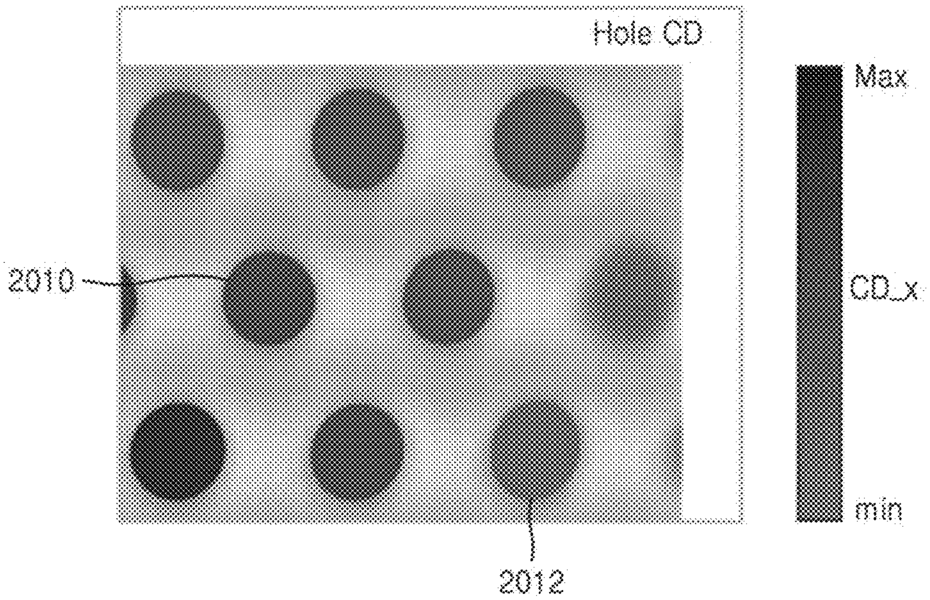
Figure 3A:
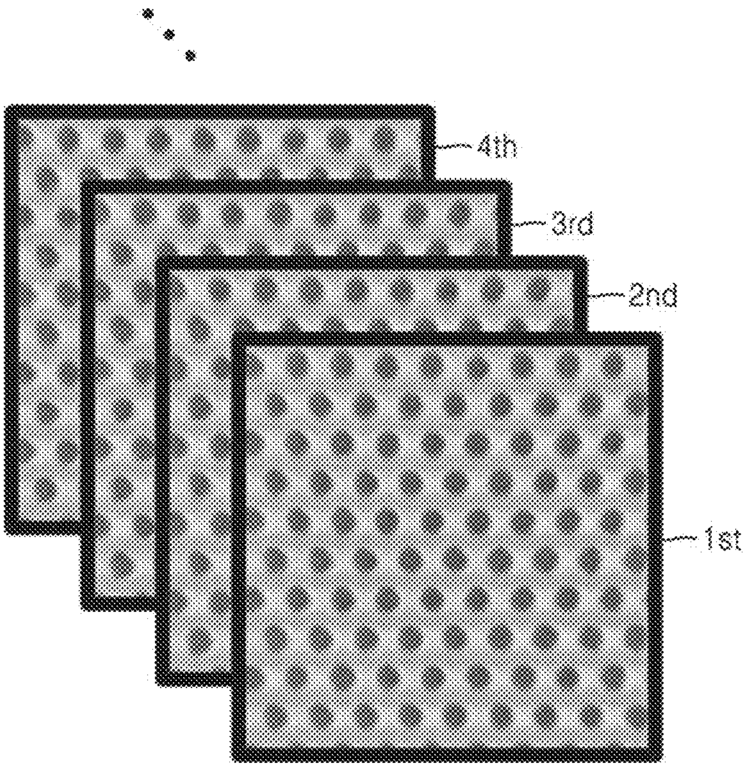
FIGS. 3A, 3B and 3C are SEM images illustrating an operation of obtaining an SEM image in an SEM image distortion correction method according to an embodiment.
Figure 3B:
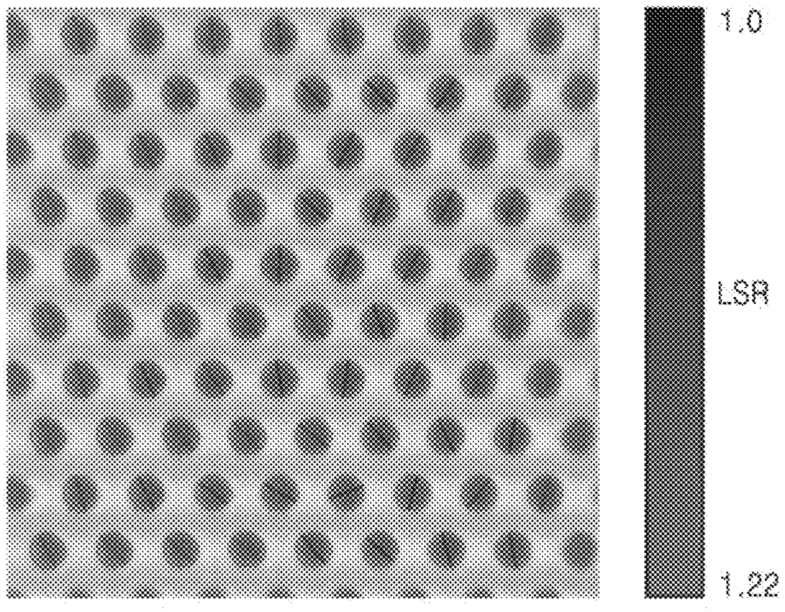
Figure 3C:
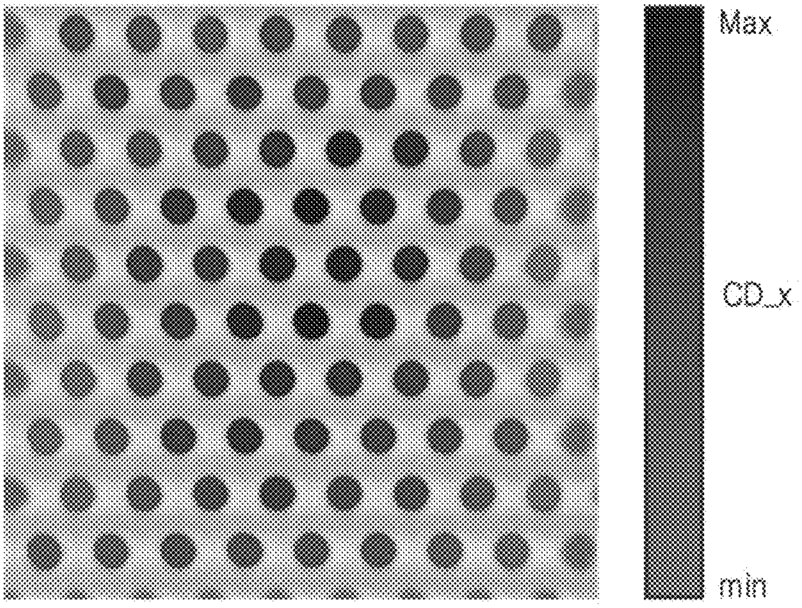
Figure 4A:
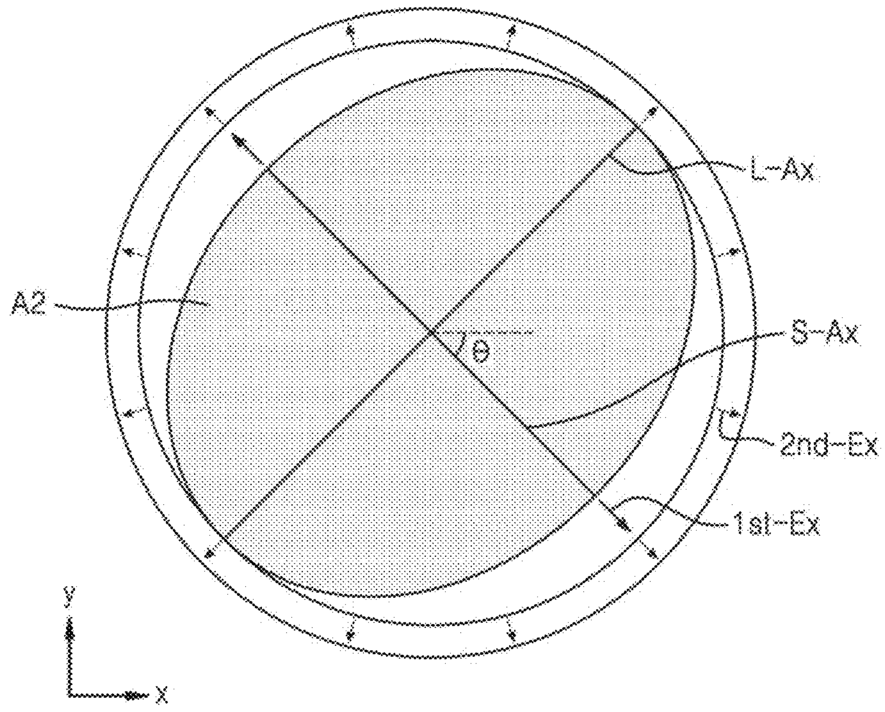
FIG. 4A is diagram illustrating an operation of expanding in the short axis direction and an operation of expanding in all directions in the SEM image distortion correction method according to an embodiment.

FIG. 1 is a flowchart illustrating a scanning electron microscope (SEM) image distortion correction method according to an embodiment. FIGS. 2A, 2B and 2C are SEM images obtained in relation to an SEM image distortion correction method according to an embodiment. That is, FIGS. 2A to 2C may represent SEM images obtained in relation to the method of correcting SEM image distortion in FIG. 1. FIGS. 3A, 3B and 3C are SEM images illustrating an operation of obtaining an SEM image in an SEM image distortion correction method according to an embodiment. FIG. 4A is diagram illustrating an operation of expanding in the short axis direction and an operation of expanding in all directions in the SEM image distortion correction method according to an embodiment. FIG. 4B is a table illustrating correction results according to an embodiment.

Referring to FIGS. 1 to 4B, in the SEM image distortion correction method according to some embodiments, SEM images of holes disposed in a two-dimensional array structure on a wafer may be obtained through SEM equipment in operation S110. The wafer may be an after develop inspection (ADI) sample. For example, the wafer of the ADI sample may refer to a wafer in which a photoresist (PR) layer is formed on a wafer substrate and holes are formed in the PR layer by exposing and developing the PR layer.

In the SEM images of FIGS. 2A to 2C, FIG. 2A includes a portion A1, and FIGS. 2B and 2C are SEM images illustrating enlarged views of portion A1 of the SEM image of FIG. 2A. In the SEM image of FIG. 2A, the long axis to short axis ratio (LSR) of each hole of the hole pattern is represented by a line passing through the long axis of each of the hole patterns. In the bar graph 200, the LSR is differentiated from 1 to 1.22 through black shading. For example, as the LSR decreases (i.e., as the LSR approaches 1.0), the shade of black becomes darker, and as the LSR increases (i.e., as the LSR approaches 1.22), the shade of black becomes lighter. For reference, in the central part of the SEM image, the holes of the hole pattern may have a circular shape with an LSR close to 1.0 and in the outer portion of the SEM image, the holes may have an ellipse shape with an LSR greater than 1.0. In the SEM image, it may be seen that as the LSR of the hole increases (e.g., as the LSR becomes greater than 1), the larger the image distortion. Accordingly, toward the central portion of the SEM image, there is almost no image distortion and image distortion increases in the outer portion of the SEM image.

In the SEM image, an LSR vector for a hole of a hole pattern may be shown as a line segment. Referring to FIG. 2B, the LSR vector of each hole of the hole pattern may be represented by a line segment passing through the long axis of the hole. For example, larger LSR vectors may be displayed in light black and smaller LSR vectors may be displayed in dark black. For example, in FIG. 2B, the LSR vector of the hole 2000 among the two holes 2000 and 2002 has a darker shade of black. Accordingly, the magnitude of the LSR vector of the corresponding hole (e.g., holes 2000 and 2002) may be close to 1.0. In contrast, the LSR vector of the right hole 2004 has a lighter shade of black. Accordingly, the magnitude of the LSR vector of the corresponding hole 2004 may be close to 1.22. In addition, the direction of the LSR vector may be defined based on an angle formed by a line segment corresponding to the LSR vector with the x-axis.

FIG. 2C is an SEM image showing a critical dimensions (CD) of the holes of hole pattern (i.e., a hole CD). As shown in FIG. 2C, the CD of hole 2010 may be near the maximum value, whereas the CD of hole 2012 (e.g., a hole toward the peripheral) may be near the minimum value.

In the operation S110 of obtaining the SEM image, as shown in FIG. 3A, a plurality of SEM images may be obtained (e.g., the 1st through 4th images shown in FIG. 3A). Furthermore, representative SEM images as shown in FIGS. 3B and 3C may be obtained by synthesizing the plurality of SEM images as shown in FIG. 3A. In addition, subsequent operations may be performed using the representative SEM images obtained in this way. FIG. 3B is a representative SEM image showing LSR vectors of holes of a hole pattern and FIG. 3C is a representative SEM image showing CDs of holes of a hole pattern.

Furthermore, the plurality of SEM images may be SEM images captured by SEM equipment at various positions on the wafer. In addition, a plurality of SEM images may be obtained by capturing holes of the same shape arranged in a two-dimensional array structure at various locations on the wafer. In the SEM image distortion correction method, a representative SEM image may be generated by synthesizing more than one thousand SEM images, for example. However, the number of SEM images used to generate the representative SEM image is not limited to the above numerical value.

In the process of obtaining a representative SEM image through synthesis of a plurality of SEM images, a distortion component due to the mask and a distortion component due to a power variation of the light source converge to 0 and only an atypical distortion component may remain. For example, the SEM image distortion correction method may correct an atypical distortion component of an SEM image. In addition, the atypical distortion component of the SEM image may include a distortion component due to electromagnetic lens aberration of the SEM equipment and a distortion component due to charging of the ADI sample during the exposure process. Distortion components due to electromagnetic lens aberration and distortion components due to charging are described in more detail at FIGS. 9A and 9B.

For reference, there are typical distortions of SEM images, and typical distortions may include, for example, barrel distortion in which the center portions of the sides are convex outwards and/or pincushion distortion in which the center portions of the sides are concave inward in a rectangular shape. Correction of this typical distortion may be achieved by obtaining a distortion function and applying its inverse function. However, since the atypical distortion of the SEM image is different from the typical distortion, the distortion function cannot be obtained and accordingly, the inverse function cannot be obtained. Therefore, the method of applying the inverse function of the distortion function cannot be applied.

After obtaining an SEM image (for example, a representative SEM image), each peripheral hole may be expanded in the short axis direction in the SEM image in operation S120. The peripheral holes may refer to holes disposed outside the central region in the SEM image. The central region may be defined as a region in which there is no or very little distortion of holes in the SEM image. For example, the central region may be defined in a rectangular shape, as indicated by CA in FIG. 7A. However, the shape of the central region is not limited to a rectangular shape. Hereinafter, holes disposed in the central region may be distinguished from peripheral holes and may be referred to as central holes.

The central portion in FIG. 4A may correspond to an enlarged view of peripheral hole A2 in FIG. 2B. As such, in the SEM image, the peripheral hole A2 may have an elliptical shape due to atypical distortion. That is, the peripheral hole A2 may have an elliptical shape having a major axis L-Ax and a minor axis S-Ax. To correct the atypical distortion, the SEM image distortion correction method may include performing the first stage expansion 1st-Ex on the minor axis S-Ax of the peripheral hole A2, such that the minor axis S-Ax of the peripheral hole A2 is substantially equal to the major axis L-Ax of the peripheral hole A2. In FIG. 4A, the first stage expansion is indicated by the arrow corresponding to the 1st-Ex indictor. Through this first stage expansion 1st-Ex, the peripheral hole A2 in the SEM image may be corrected from an elliptical shape to a circular shape.

After expansion of each of the peripheral holes in the short axis direction, each of the peripheral holes may be expanded in all directions in the SEM image in operation S130. All directions may refer to all 360° directions of the circle. Furthermore, "all directions" may refer to multiple radial directions or multiple linear directions, but the term "all directions" should not be understood to specially limit the operation to expanding the hole in every conceivable direction. That is, the holes may be expanded in "multiple directions" as would be used to correct distortions according to embodiments of the disclosure. Enlargement of the peripheral holes in all directions may be performed such that the diameters of the peripheral holes is substantially equal to the diameter of the central holes. In general, the peripheral holes may be smaller in size than the central holes due to the atypical distortion of the SEM image. Therefore, to correct for atypical distortion, the peripheral hole may be subjected to a second stage expansion 2nd-Ex in all directions such that the diameter of the peripheral hole is substantially equal to the diameter of the central hole. In FIG. 4A, the second stage expansion 2nd-Ex is indicated in several places by corresponding short arrows. In this way, through the first stage expansion 1st-Ex and the second stage expansion 2nd-Ex, the peripheral hole in the SEM image may be corrected to have substantially the same shape and size as the central hole.

In relation to the diameter of the central hole, as described above, the central hole is defined as a hole in the central region and generally, a plurality of central holes may exist in the central region. Therefore, the diameter of the central hole may be calculated as an average diameter by averaging the diameters of a plurality of center holes in the central region. However, the diameter of the central hole is not limited to the average diameter. For example, according to an embodiment, the diameter of the central hole may be calculated as the diameter of the hole located at the very center of the central region, or may be calculated as the diameter of the hole closest to the circular shape in the central region.

In the table of FIG. 4B, the angle θ of the short axis S-Ax and the expansion ratio Ex-Ratio of the first stage expansion 1st-Ex of the peripheral holes corresponding to 8 columns of row 1 and 2 columns of row 2 of the SEM image of FIG. 2A are shown, and the expansion ratio in the second stage expansion 2nd-Ex are shown. For example, in the case of the peripheral hole of the first row and eighth column corresponding to A2 in FIG. 2B, as shown in 4000, in the first stage expansion 1st-Ex, the angle θ of the short axis S-Ax is −11.20° and the expansion ratio is 11.2%. and in the second stage expansion 2nd-Ex, the expansion ratio is 5.3%.

In addition, the first stage expansion 1st-Ex and the second stage expansion 2nd-Ex may be performed for all peripheral holes. In addition, the first stage expansion 1st-Ex and the second stage expansion 2nd-Ex may be performed on peripheral holes of actual individual SEM images, not representative SEM images. In other words, the representative SEM image may be used to extract the central region, the central hole, and the diameter of the central hole, which are standards for first stage expansion 1st-Ex and second stage expansion 2nd-Ex, and substantial corrections through first stage expansion 1st-Ex and second stage expansion 2nd-Ex may be performed on the peripheral holes of individual SEM images.

After expansion in all directions for each of the peripheral holes, the positions of the peripheral holes may be corrected in operation S140. In the SEM image, the peripheral hole may be distorted in shape and may also be distorted in position due to atypical distortion. For example, in the SEM image, due to atypical distortion, the shape of the peripheral hole may be deformed from a circle to an ellipse and the position may also be changed from an original position to another position. Position correction of peripheral holes may be performed using a lattice constant of center holes disposed in a central region. Position correction of the peripheral holes is described in more detail at FIGS. 7A and 7B For reference, in the SEM image, shape distortion of the hole may cause an error in measuring the hole CD using the SEM image. For example, in measuring the hole CD in the x direction using the SEM image, the hole is deformed into an elliptical shape due to shape distortion, such that an error in which a measured hole CD is smaller than the actual circular hole CD may occur. Also, distortion of the position of the hole may cause errors in measuring the position of the hole and measuring the distance between the holes. Accordingly, to prevent measurement errors, only holes of a central region having relatively small distortion (i.e., center holes) may be used for measurement. However, even when only the center holes are used for measurement, the problem caused by atypical distortion cannot be completely excluded, and in addition, if the central region is excessively reduced, problems related to the confidence interval of the measurement data may occur due to the decrease in the number of holes used for measurement.

The SEM image distortion correction method according to embodiments may include obtaining a representative SEM image by synthesizing a plurality of SEM images. The SEM image distortion correction method may include correcting the short axis expansion 1st-Ex for each of the peripheral holes, correct all direction expansion 2nd-Ex for each of the peripheral holes based on representative SEM images, and correcting the position of the peripheral holes. The SEM image distortion correction method according to embodiments may accurately correct the atypical distortion of the SEM image (i.e., the atypical distortion of peripheral holes of the outer portion of the SEM image through the multi-step correction of the processes described above. Thus, the SEM image distortion correction method according to embodiments may improve the reliability of measurement of holes using SEM images, such as hole CD measurement of holes, position measurement of holes, distance measurement between holes, and the like, and thus, yield and reliability of semiconductor products may be improved.

Figure 5A:
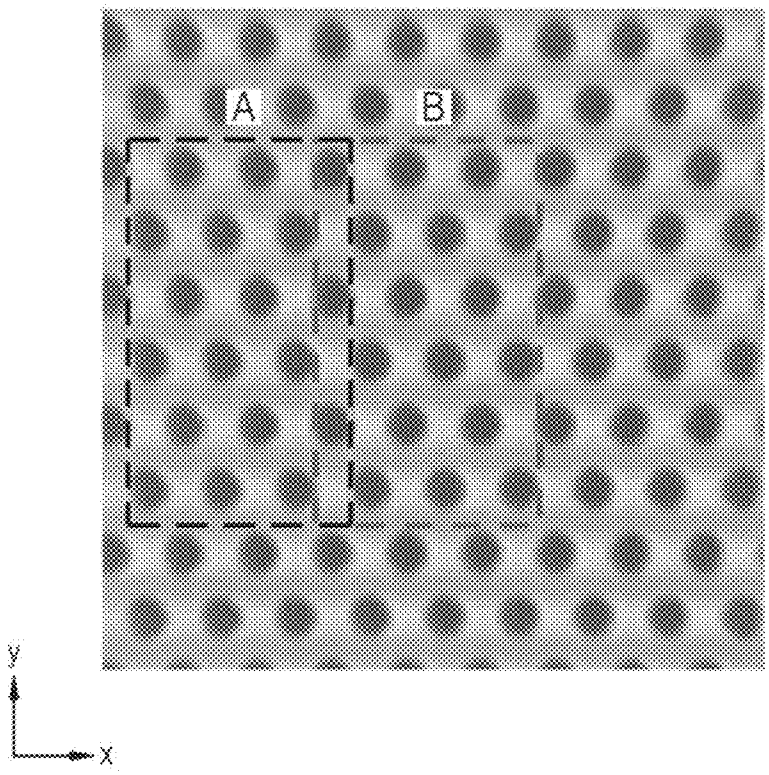
FIG. 5A is an SEM image illustrating a first region and a second region in the SEM image according to an embodiment.
Figure 5B:
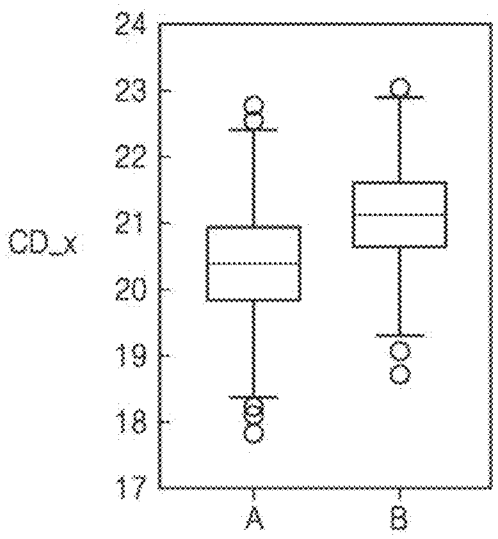
FIGS. 5B and 5C are graphs illustrating results respectively before and after applying an image distortion correction method to the first region and the second region, according to an embodiment.
Figure 5C:
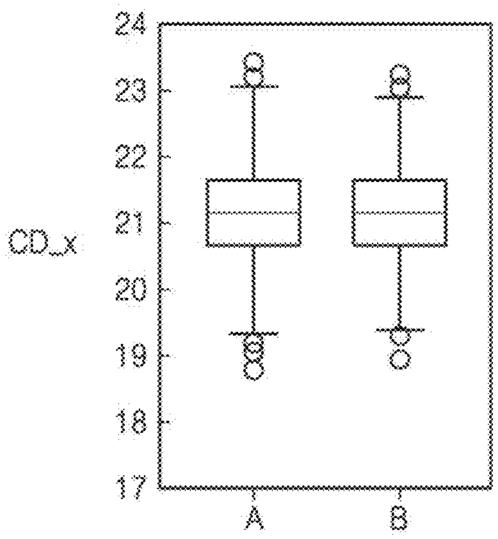

FIG. 5A is an SEM image illustrating a first region A and a second region B in the SEM image according to an embodiment. FIGS. 5B and 5C are graphs illustrating results respectively before and after applying an image distortion correction method to the first region and the second region, according to an embodiment. FIG. 5D is a table illustrating comparison results according to an embodiment. In FIGS. 5B and 5C, the x-axis represents the type of region, the y-axis represents the hole CD CD_x (e.g., the CD in the x direction as shown in, for example, FIG. 2C), and the unit of the y-axis may be an arbitrary unit.

Referring to FIGS. 5A and 5B, in the SEM image of FIG. 5A, the first region A and the second region B are shown as dashed rectangles. The first region A may include a part of the peripheral region of the SEM image. In addition, the second region B may include a part of the central region and a part peripheral regions of the SEM image. In other words, the second region B may include the central region in the center in the y-direction and include portions of peripheral regions at both outer portions in the y-direction.

As may be seen in FIG. 5B, before applying the correction method of the SEM image, in the case of the holes of the first region A (e.g., the peripheral holes), compared to the second region B, the hole CD is generally distributed low and the average hole CD is also low. On the other hand, in the case of the holes of the second region B (e.g., the center hole and the peripheral holes are mixed), the x-direction hole CD is distributed higher than that of the first region A and the average hole CD also is high. As described above, in the SEM image, since image distortion is greatly generated in the peripheral holes, the natural result may be that the x-direction hole CD is low in the first region A.

Referring to FIGS. 5A and 5C, as shown in FIG. 5C, after applying the SEM image distortion correction method according to embodiment, in the case of the holes of the first region A (e.g., the peripheral holes), the x-direction hole CDs are distributed similar to the second region B and the average hole CD is also similar to the second region B.

As shown in FIGS. 5B and 5C, the x-direction hole CD of the second region B in FIG. 5B is similar to the x-direction hole CD of the second region B in FIG. 5C. Therefore, it may be inferred that there is almost no distortion of the holes of the second region B. On the other hand, the x-direction hole CD of the first region A in FIG. 5B is significantly different than the x-direction hole CD in the first region A in FIG. 5C. Furthermore, as shown in FIG. 5C, the x-direction hole CD of the first region A is almost the same as the x-direction hole CD of the second region B. Therefore, it may be inferred that through the SEM image distortion correction method according to embodiments, the x-direction hole CD in of the first region A is increased to be similar to the actual x-direction hole CD.

Referring to FIG. 5D, the table shows the results of FIGS. 5B and 5C through various numerical values. For example, in FIG. 5D, the average and spread 30 of the x-direction hole CD CD_x of the hole are displayed and the unit of average and spread 30 may be an arbitrary unit. More specifically, before the application of the SEM image distortion correction method (before correction), in the first region A and the second region B, the average of the x-direction hole CD CD_x is 20.37 and 21.12, respectively, and the spread 30 is 2.36 and 2.01, respectively. In contrast, after the application of the SEM image distortion correction method according to embodiments (after correction), in the first region A and the second region B, the average of the x-direction hole CD CD_x is 21.15 and 21.18, respectively, and the spread 30 is 1.95 and 1.3, respectively. Therefore, primarily, through the SEM image distortion correction method according to embodiments, it may be seen that the average of the x-direction hole CDs CD_x of the first region A increases and the spread 30 of the first region A decreases, such that that the distortion of the SEM image is greatly improved.

On the other hand, after applying the SEM image distortion correction method according to embodiments, the average of the x-direction hole CDs CD_x of the second region B slightly increases from 21.12 to 21.18 and the spread 30 also slightly decreases from 2.01 to 1.93. Therefore, through the SEM image distortion correction method according to embodiments, the average of the x-direction hole CD CD_x of the second region B also slightly increased and the spread 30 of the second region B slightly decreased. Thus, it may be seen that the SEM image distortion in the second region B is also improved.

As a result, through the SEM image distortion correction method according to embodiments, the effect of atypical distortion is excluded such that a skew of the x-direction hole CD CD_x between the outer portion and the center portion of the SEM image (e.g., between the first region A and the second region B) may be greatly reduced. In addition, through the SEM image distortion correction method according to embodiments, since the effect of atypical distortion is excluded, a more accurate x-direction hole CD CD_x may be obtained even in the central portion (e.g., the second region B). The x-direction hole CD CD_x may include an average and a spread.

Figure 6A:
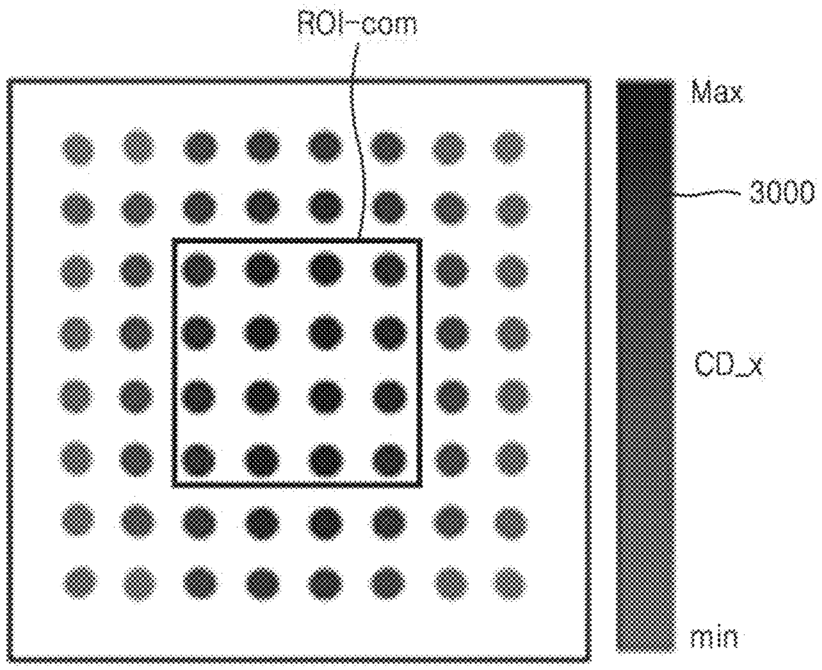
FIGS. 6A and 6B are SEM images illustrating a region of interest (ROI) region respectively before and after applying an image distortion correction method according to an embodiment.
Figure 6B:
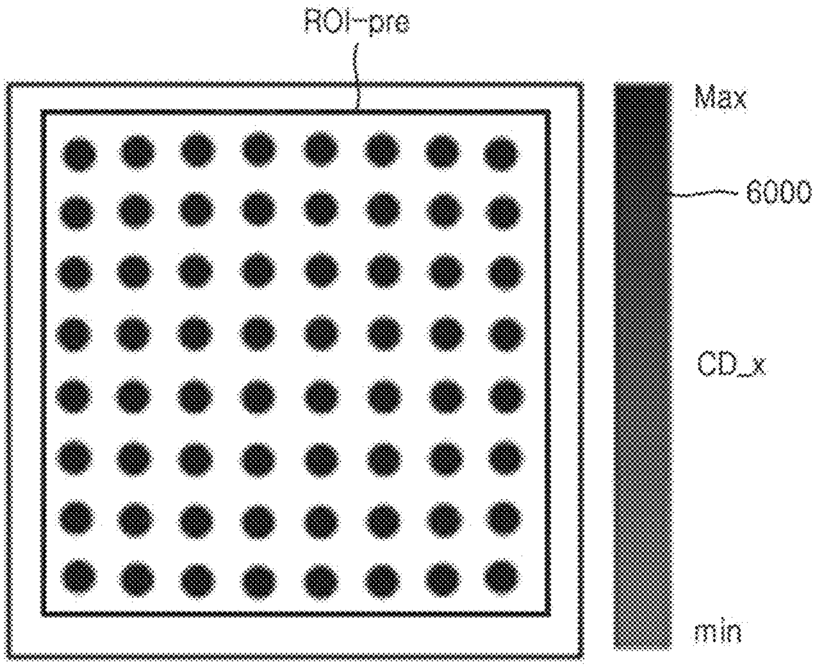

FIGS. 6A and 6B are SEM images illustrating a region of interest (ROI) region respectively before and after applying an image distortion correction method according to an embodiment. FIG. 6A is an SEM image before application of an image distortion correction method according to embodiments and FIG. 6B is an SEM image after application of an image distortion correction method according to embodiments.

In each of the SEM images of FIGS. 6A and 6B, the x-direction hole CD CD_x of the holes is displayed using shading and the bar graph 6000 shows the shading standard. For example, the darker the shading (i.e., the closer to the Max level), the larger the x-direction hole CD CD_x, and the lighter the shading (i.e., the closer to the min level), the smaller the x-direction hole CD CD_x. In terms of image distortion, a dark black hole CD CD_x may correspond to a hole with small distortion and a light black hole CD CD_x may correspond to a hole with large distortion.

As shown in FIG. 6A, in the case of the SEM image before applying the image distortion correction method according to embodiments, holes disposed in the center of the SEM image have x-direction hole CD CD_x approaching the Max level. Accordingly, for the measurement of the x-direction hole CD CD_x, only holes in the center of the SEM image with little distortion may be used. As a result, in the case of the SEM image of FIG. 6A, the ROI region ROI-com is defined only in part in the center and only a small number of holes within a narrow ROI region ROI-com may be used even in the measurement of x-direction hole CD CD_x. Therefore, the reliability of measurement data may be low.

On the other hand, as shown in FIG. 6B, in the case of the SEM image after applying the image distortion correction method according to embodiments, holes having x-direction hole CD CD_x approaching the Max level are shown over the entire region of the SEM image. Accordingly, for the measurement of the x-direction hole CD CD_x, holes of the entire SEM image may be used. As a result, in the case of the SEM image of FIG. 6B, the ROI region ROI-pre is defined as the entire SEM image and all holes included in the entire SEM image may be used for measurement of the x-direction hole CD CD_x. Therefore, the reliability of measurement data may be greatly increased.

Figure 7A:
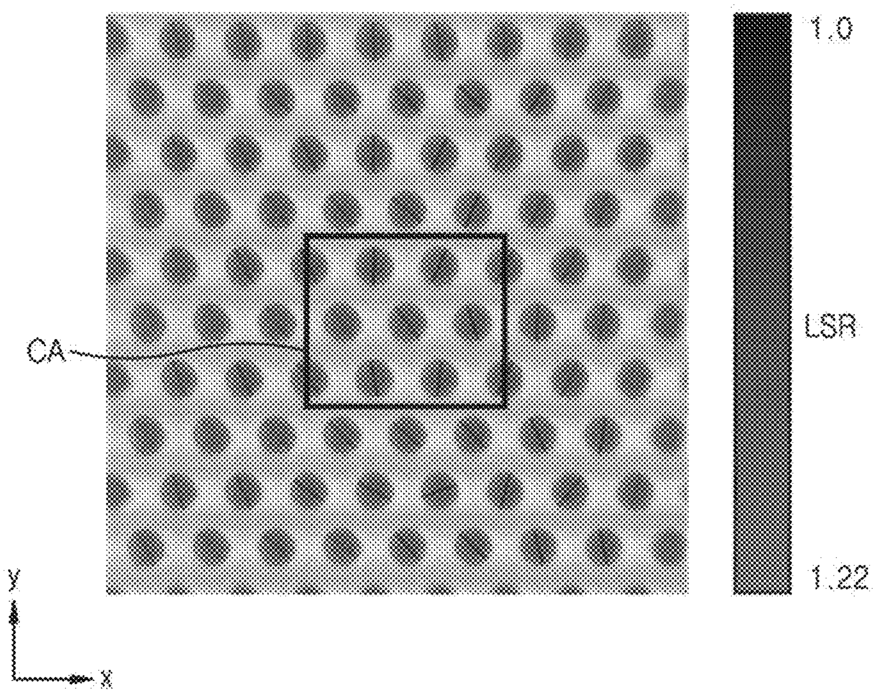
FIG. 7A is a diagram of an SEM image according to an embodiment.
Figure 7B:
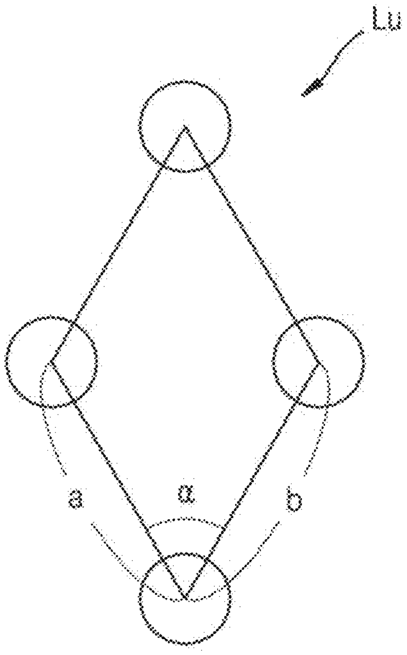
FIG. 7B is a diagram illustrating unit lattice structures according to an embodiment.

FIG. 7A is a diagram of an SEM image according to an embodiment. FIG. 7B is a diagram illustrating unit lattice structures according to an embodiment. FIG. 7C is a table illustrating position correction values according to an embodiment.

Referring to FIGS. 7A to 7C, the lattice constant may refer to the horizontal, vertical, and height spacing between atoms in a crystal in which molecules of the same shape and structure gather. Also, in general, the lattice constant may be defined in three dimensions and may be represented by the lengths a, b, and c of three edges of the three-dimensional (3D) unit cell and the angles therebetween a, B, and y.

In the image distortion correction method according to embodiments, holes may be arranged in a two-dimensional array structure on a wafer. Therefore, based on the two-dimensional array structure of the holes, in the image distortion correction method according to embodiments, the lattice constant used for position correction of the holes may be defined two-dimensionally. For example, as shown in FIG. 7B, the lattice constant may be represented by a and b, which are the lengths of two sides of the two-dimensional unit cell Lu, and a, which is the angle therebetween.

To calculate the lattice constant, as shown in FIG. 7A, a central region CA may be defined in the SEM image. The central region CA may be defined in the central part of the SEM image to include central holes with little distortion. It is assumed that the holes in this central region CA are arranged in the x and y directions and there is no distortion. The distortion may include shape distortion corresponding to shape deformation of holes and position distortion corresponding to position change of holes. As a result, it is assumed that the holes in the central region CA are substantially free of shape distortion and location distortion.

After defining the central region CA, the unit cell Lu is extracted using the central holes as shown in FIG. 7B and the lattice constant may be calculated based on the structure of the unit cell. For example, the lengths a and b of the two sides of the unit cell Lu and the angle $\alpha$ therebetween may be calculated as lattice constants. If there is no distortion in the entire SEM image, the holes may be regularly and uniformly arranged in the x-direction and the y-direction. For example, all of the holes in the SEM image may exist at normal positions and may accurately correspond to the repeating structure of the unit cell Lu.

However, in general, distortion may exist in the SEM image. For example, distortion may exist in the peripheral region outside of the central region CA in the SEM image. Specifically, the peripheral holes of the peripheral region in the SEM image may include shape distortion and positional distortion. In the SEM image distortion correction method according to embodiments, the shape distortion of the peripheral holes may be corrected through the first stage expansion 1st-Ex of the operation S120 of expanding in the short axis direction and the second stage expansion 2nd-Ex of the operation S130 of expanding in all directions. Accordingly, shape distortion components of the peripheral holes may be substantially the same as distortion components corrected in the first stage expansion 1st-Ex and the second stage expansion 2nd-Ex.

Distortion of the position of the peripheral holes may be corrected using the lattice constant. In other words, the unit cell Lu may be repeatedly arranged in the x and y directions, or the positions of the lattice points may be calculated using the lattice constant, and positional skew between the lattice points and corresponding peripheral holes may be extracted as positional distortion components. In addition, position distortion of the peripheral holes may be corrected by moving the positions of the peripheral holes based on the extracted position distortion components.

In the table of FIG. 7C, positional skews (shown as pos. skew) of the holes up to the fourth column of the first row of the SEM image of FIG. 7A are shown as numerical values. As described above, the lattice constant may be calculated using the central holes in the central region CA of the SEM image of FIG. 7A and the positional skew may be calculated as the difference between the locations of lattice points and the locations of corresponding peripheral holes based on the calculated lattice constant. For reference, in the table of FIG. 7C, (−)x values may refer to positions on the SEM image where the hole is located to the left of the original position in the x direction (i.e., the lattice point position), and may indicate that the hole is required to be moved to the right through correction. Also, (−)y values may refer to positions on the SEM image where the hole is located below the original position in the y direction (i.e., the lattice point position), and may indicate that the hole is required to be moved upward through correction. In the case of a (+) value, this may mean the opposite of a (−) value, but (+) values may not appear because SEM image distortion mainly appears in the direction of contraction.

FIG. 8 is a table illustrating final correction values obtained through an operation of expanding in the short axis direction, an operation of expanding in the entire direction, and an operation of correcting the position in an SEM image distortion correction method according to an embodiment.

Referring to FIG. 8, the values corresponding to the holes up to the fourth column of the first row of the SEM image of FIG. 2A or FIG. 7A (i.e., the angle θ and expansion ratio of the short axis S-Ax in the first stage expansion 1st-Ex, the expansion ratio in the second stage expansion 2nd-Ex) may be substantially the same as those shown in up to the fourth column of the first row in the table of FIG. 4B, and thus repeated deceptions may be omitted. Also, the positional skew of the table of FIG. 8 may be substantially the same as the positional skew of the table of FIG. 7C. Therefore, a repeated description may be omitted.

Figure 9A:
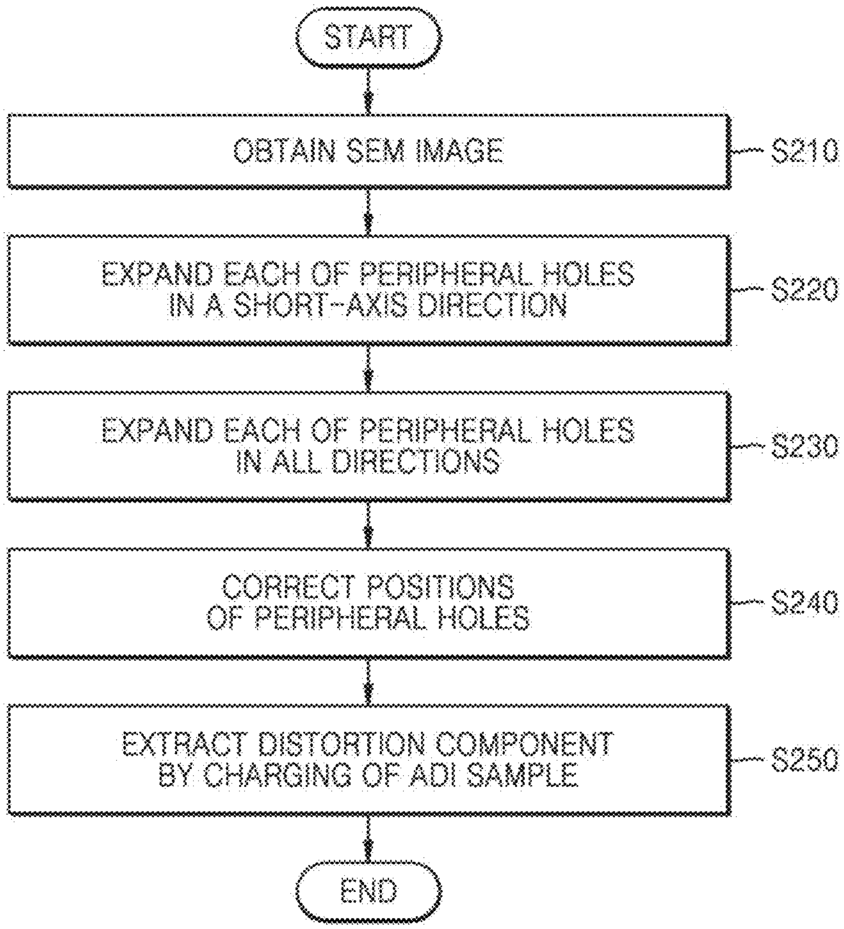
FIG. 9A is a flowchart illustrating a SEM image distortion correction method according to an embodiment.
Figure 9B:
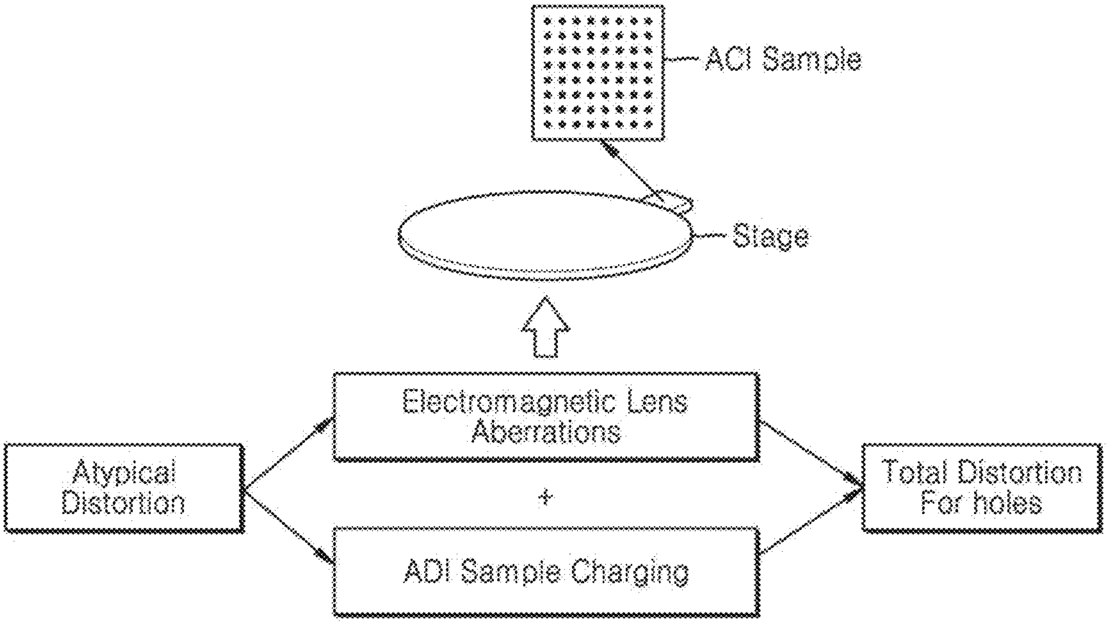
FIG. 9B is a diagram illustrating an operation of extracting a distortion component by charging of an after develop inspection (ADI) sample in an SEM image distortion correction method according to an embodiment.

FIG. 9A is a flowchart illustrating a SEM image distortion correction method according to an embodiment. FIG. 9B is a diagram illustrating an operation of extracting a distortion component by charging of an ADI sample in an SEM image distortion correction method according to an embodiment.

Referring to FIGS. 9A and 9B, the SEM image distortion correction method according to embodiments may be different from the SEM image distortion correction method of FIG. 1 in terms of further including operation S250 of extracting the distortion component by charging of the ADI sample. Specifically, in the SEM image distortion correction method according to embodiments, operations S210 to S240 may be sequentially performed and may be substantially the same as operations S110 to S140, respectively. Therefore, repeated descriptions may be omitted.

After correcting the positions of the peripheral holes, a distortion component due to charging of the ADI sample may be extracted in operation S250. As described above, the atypical distortion of SEM images may largely include distortion due to electromagnetic lens aberration of the SEM equipment and distortion due to charging of the ADI sample. In addition, total distortion of the holes in the SEM image may include shape distortion and positional distortion. For example, the shape distortion component may include a distortion component corrected in the first stage expansion 1st-Ex in operation S220 and the second stage expansion 2nd-Ex in operation S230. Also, the position distortion component may include a distortion component corrected in operation S240 (e.g., correction of position skew between positions of lattice points predicted through lattice constants and corresponding holes).

Distortion due to electromagnetic lens aberration of SEM equipment may be calculated using after cleaning inspection (ACI) samples. In the case of an ACI sample, the ACI sample may include a path through which charges may be released, and therefore, charging of ADI samples may be prevented through grounding or the like. Therefore, only the distortion component due to the electromagnetic lens aberration of the SEM equipment may be calculated from the atypical distortion of the SEM image using the ACI sample. In FIG. 9B, a stage may correspond to a support body on which an ADI sample or an ACI sample is placed and which supports the sample. In FIG. 9B, the ACI sample is shown in a small rectangular shape but is not limited thereto, and the ACI sample may have a wafer shape and have a size similar to that of the stage.

The atypical distortion of the SEM image may be substantially equal to the total distortion of holes in the SEM image. Also, as described above, the total distortion of the holes in the SEM image may be obtained through operation S220 to operation S240. Therefore, by subtracting the distortion component due to the electromagnetic lens aberration of the SEM equipment from the total distortion of the holes in the SEM image, distortion components due to charging of ADI samples may be calculated.

In operation S250 of extracting the distortion component by charging of the ADI sample, first, the total distortion of the holes in the SEM image may be calculated. The total distortion of the holes in the EM image may be obtained in operation S220 to operation S240. A distortion component due to the electromagnetic lens aberration of the SEM equipment may be calculated using the ACI sample. Thereafter, a distortion component due to charging of the ADI sample may be calculated by subtracting a distortion component due to electromagnetic lens aberration from the total distortion.

Figure 10:
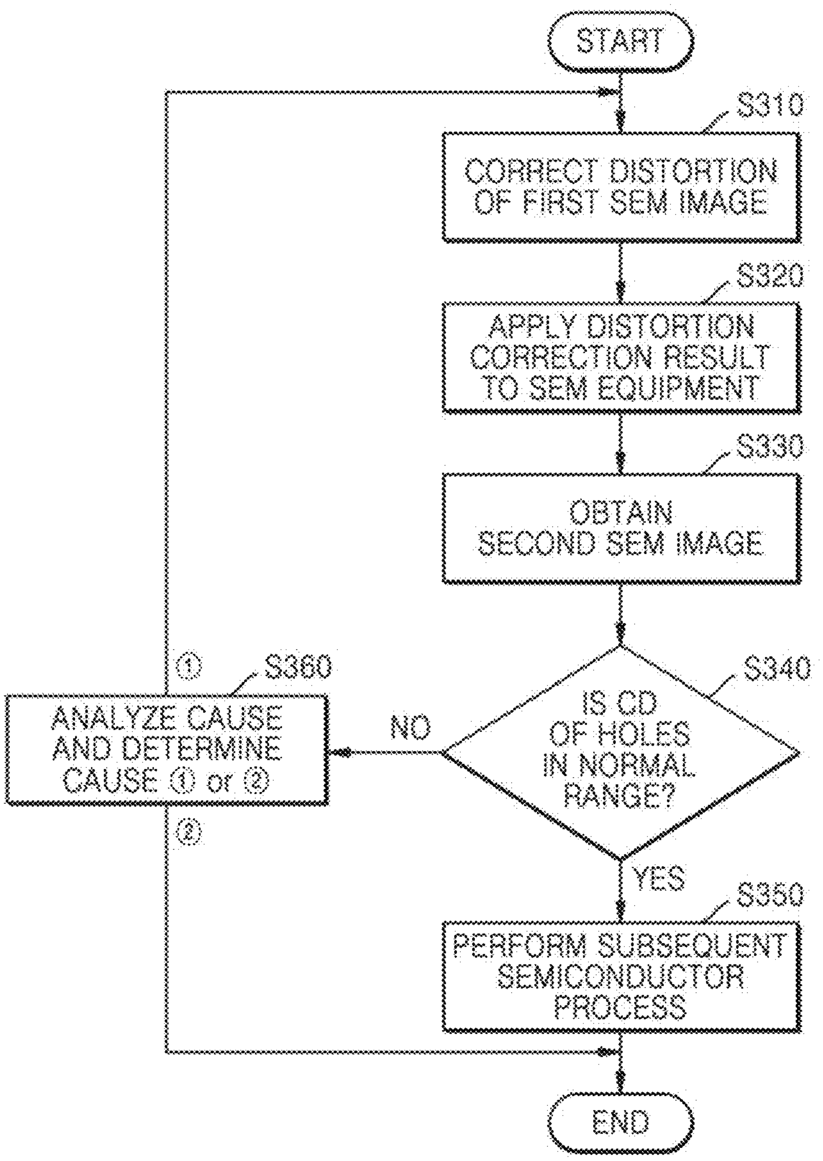
FIG. 10 is a flowchart illustrating a semiconductor device manufacturing method including an SEM image distortion correction method according to an embodiment.

FIG. 10 is a flowchart illustrating a semiconductor device manufacturing method including an SEM image distortion correction method according to an embodiment. FIG. 10 may include features similar to those described in FIGS. 1 to 9B and repeated descriptions may be omitted.

Referring to FIG. 10, the semiconductor device manufacturing method including the SEM image distortion correction method according to embodiments may include correcting distortion of the first SEM image of the holes arranged in a two-dimensional array structure on the first wafer in operation S310. The first wafer may be, for example, an ADI sample. Operation S310 may include operations of the method of correcting the distortion of the SEM image of FIG. 1. Also, operation S310 may include operations of the method of correcting the distortion of the SEM image of FIG. 9A.

After correcting the distortion of the first SEM image, the distortion correction result may be applied to the SEM equipment in operation S320. Applying the method to the SEM equipment may refer to the distortion components calculated in operation S310 being input to the SEM equipment. When obtaining an SEM image using SEM equipment in the future, an SEM image with distortion corrected may be obtained by excluding the effect of distortion components. To automatically exclude the effects of distortion components in the SEM equipment, the distortion components may be input into the SEM equipment in the form of a function (e.g., a distortion correction function).

After applying the distortion correction result to the SEM equipment, a second SEM image of holes disposed in a two-dimensional array structure on the second wafer may be obtained in operation S330. The second wafer may be, for example, a device wafer on which semiconductor devices are actually formed.

After obtaining the second SEM image, CDs of holes on the second wafer may be measured based on the second SEM image and it may be determined whether the CDs of the holes are within a normal range in operation S340. If the CDs of the holes are within the normal range (YES in operation S340), a subsequent semiconductor process may be performed on the second wafer in operation S350. The subsequent semiconductor process may include various processes. For example, the subsequent semiconductor process may include a deposition process, an exposure process, an etching process, an ion process, a cleaning process, and the like. In addition, the subsequent semiconductor process may include a singulation process of individualizing a wafer-shaped semiconductor substrate into individual semiconductor chips, a test process of testing the semiconductor chips, and a packaging process of packaging the semiconductor chips. A semiconductor device may be completed through a subsequent semiconductor process for a semiconductor substrate.

If the CDs of the holes are out of the normal range (NO in operation S340), the cause may be analyzed in operation S360. If the cause is due to the SEM image distortion correction method (i.e., cause ①), the method may proceed to operation S310 where the distortion of the first SEM image may be corrected. For example, in the case of ①, although the CD of the holes is normal, there may be an error in the SEM image distortion correction method, such that it is out of the normal range. In this case, in operation S310, the error may be solved by identifying and removing errors in the SEM image distortion correction method.

If the cause has nothing to do with the SEM image distortion correction method (i.e., cause ②, the semiconductor device manufacturing method may end. In the case of ②, the second SEM image may be normal and the CD of the holes actually formed on the second wafer may be defective. In this case, since the problem is the patterning process, the semiconductor device manufacturing method may be terminated and the cause may be analyzed and resolved by moving to the corresponding patterning process.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A scanning electron microscope (SEM) image distortion correction method comprising:
- obtaining at least one SEM image of holes provided on a wafer in a two-dimensional array structure, the holes comprising at least one central hole within a central region of the at least one SEM image and a plurality of peripheral holes outside the central region;
- expanding each of the plurality of peripheral holes in a minor axis direction such that a ratio of a minor axis to a major axis of each of the plurality of peripheral holes is 1:1; and
- expanding each of the plurality of peripheral holes in multiple directions in the at least one SEM image such that a diameter of the at least one central hole and a diameter of at least one of the plurality of peripheral holes are substantially equal to each other.

2. The method of claim 1, wherein the obtaining of the at least one SEM image comprises:
- obtaining a plurality of SEM images, and synthesizing the plurality of SEM images to obtain a representative SEM image.

3. The method of claim 2, wherein the expanding of each of the plurality of peripheral holes in the minor axis direction and the expanding of each of the plurality of peripheral holes in the multiple directions are performed for each of the plurality of SEM images based on the representative SEM image.

4. The method of claim 1, wherein the central region is defined as a rectangle,
- wherein the at least one central hole comprises a plurality of central holes,
- wherein the plurality of central holes are in the rectangle, and
- wherein a diameter of the plurality of central holes is calculated by averaging diameters of the plurality of central holes in the rectangle.

5. The method of claim 4, wherein the holes on the wafer are arranged in the two-dimensional array structure in a first direction and a second direction perpendicular to the first direction.

6. The method of claim 1, further comprising correcting positions of the plurality of peripheral holes.

7. The method of claim 6, wherein the correcting of the positions of the plurality of peripheral holes comprises correcting the positions of the plurality of peripheral holes based on lattice constants of a plurality of central holes disposed in the central region.

8. The method of claim 7, wherein the central region is defined as a rectangle, and
- wherein the correcting of the positions of the plurality of peripheral holes comprises:
  - determining lattice constants for the at least one central holes within the rectangle; and
  - moving the positions of the plurality of peripheral holes based on the determined lattice constant.

9. The method of claim 6, wherein the wafer comprises an after develop inspection (ADI) sample, and
- wherein the method further comprises, after the correcting of the positions of the plurality of peripheral holes, extracting a distortion component corresponding to charging of the ADI sample.

10. The method of claim 9, wherein the extracting of the distortion component comprises:
- determining a distortion component caused by electromagnetic lens aberration of SEM equipment based on at least one after cleaning inspection (ACI) sample.

11. The method of claim 10, wherein a total distortion component of the at least one SEM image comprises a shape distortion component and a position distortion component, and
- wherein the extracting of the distortion component further comprises:
  - determining a first distortion component due to charging of the ADI sample by subtracting a second distortion component caused by the electromagnetic lens aberration from the total distortion component.

12. A scanning electron microscope (SEM) image distortion correction method comprising:
- obtaining at least one SEM image of holes arranged in a two-dimensional array structure on a wafer, the wafer being an after develop inspection (ADI) sample, the holes comprising at least one central hole within a central region of the at least one SEM image and a plurality of peripheral holes outside the central region;
- expanding each of the plurality of peripheral holes in a minor axis direction such that a ratio of a minor axis to a major axis of each of the plurality of peripheral holes is 1:1;
- expanding each of the plurality of peripheral holes in multiple directions such that a diameter of a central hole and a diameter of at least one of the plurality of peripheral holes are substantially the same in the at least one SEM image; and correcting positions of the plurality of peripheral holes based on lattice constants of the at least one central hole.

13. The method of claim 12, wherein the obtaining of the at least one SEM image comprises:

obtaining a plurality of SEM images; and obtaining a representative SEM image by synthesizing the plurality of SEM images, and wherein expanding of each of the plurality of peripheral holes in the minor axis direction and the expanding of each of the plurality of peripheral holes in the multiple directions are performed for each of the plurality of SEM images based on the representative SEM image.

14. The method of claim 12, wherein the central region is defined as a rectangle, and wherein the correcting of the positions of the plurality of peripheral holes comprises:

determining lattice constants for of the at least one central hole that is within the rectangle; and moving the positions of the plurality of peripheral holes based on the determined lattice constant.

15. The method of claim 12, wherein a total distortion component of the at least one SEM image comprises a first distortion component caused by electromagnetic lens aberration of SEM equipment and a second distortion component caused by charging of the ADI sample, and wherein the method further comprises, after correcting the positions of the plurality of peripheral holes, extracting the second distortion component.

16. The method of claim 15, wherein the extracting of the second distortion component comprises:

obtaining the total distortion component of the at least one SEM image;

determining the first distortion component based on at least one after cleaning inspection (ACI) sample; and determining the second distortion component by subtracting the first distortion component from the total distortion component, wherein the obtaining of the total distortion component of the at least one SEM image comprises summing a shape distortion component for each hole corrected in the expanding of each of the plurality of peripheral holes in the minor axis direction and the expanding each of the plurality of peripheral holes in multiple directions, and a position distortion component for each hole corrected in the correcting the positions of the plurality of peripheral holes.

17. A semiconductor device manufacturing method comprising:

correcting distortion of a first scanning electron microscope (SEM) image of first holes in a two-dimensional array structure on a first wafer, the first wafer being an after develop inspection (ADI) sample;

applying a result of correcting the distortion of the first SEM image to an SEM equipment;

obtaining a second SEM image of second holes in a two-dimensional array structure on a second wafer using the SEM equipment;

determining whether critical dimensions (CDs) of the second holes on the second wafer are within a normal range; and performing a subsequent semiconductor process on the second wafer based on determining the CDs are within the normal range, wherein the correcting of the distortion of the first SEM image comprises:

obtaining the first SEM image of the first holes from the first wafer, the first holes comprising at least one central hole within a central region of the first SEM image and a plurality of peripheral holes outside the central region of the first SEM image;

expanding each of the plurality of peripheral holes in a minor axis direction such that a ratio of a minor axis to a major axis of the plurality of peripheral holes is 1:1;

expanding each of the plurality of peripheral holes in multiple directions such that a diameter of the at least one central hole and a diameter of at least one of the plurality of peripheral holes are substantially the same in the first SEM image; and correcting positions of the plurality of peripheral holes based on lattice constants of at least one central hole.

18. The method of claim 17, wherein the correcting of the distortion of the first SEM image comprises correcting atypical distortion occurring in an outer portion of the first SEM image, wherein the central region of the first SEM image is defined as a rectangle, and wherein the correcting of the positions of the plurality of peripheral holes comprises:

determining the lattice constants for the at least one central hole within the rectangle; and moving the positions of the plurality of peripheral holes based on determined the lattice constants.

19. The method of claim 17, wherein a total distortion component of the first SEM image comprises a first distortion component caused by electromagnetic lens aberration of the SEM equipment and a second distortion component caused by charging of the ADI sample, and wherein the correcting of the distortion of the first SEM image further comprises, after the correcting of the positions of the plurality of peripheral holes, extracting the second distortion component.

20. The method of claim 19, wherein the total distortion component comprises a shape distortion component for each hole corrected in the expanding of each of the plurality of peripheral holes in the minor axis direction and the expanding each of the plurality of peripheral holes in multiple directions, and a position distortion component for each hole corrected in the correcting the positions of the plurality of peripheral holes, and wherein the extracting of the second distortion component comprises:

determining the first distortion component based on at least one after cleaning inspection (ACI) sample; and determining the second distortion component by subtracting the first distortion component from the total distortion component.

* * * * *